United States Patent
Ling et al.

(10) Patent No.: US 12,209,150 B2
(45) Date of Patent: Jan. 28, 2025

(54) PHOTOCURABLE RESIN COMPOSITION WITH LOW SHRINKAGE AND HIGH ACCURACY FOR USE IN ADDITIVE MANUFACTURING PROCESSES

(71) Applicant: James R. Glidewell Dental Ceramics, Inc., Newport Beach, CA (US)

(72) Inventors: Long Ling, Anaheim, CA (US); Nahal Taremi, Santa Ana, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 0 days.

(21) Appl. No.: 17/665,786

(22) Filed: Feb. 7, 2022

(65) Prior Publication Data

US 2022/0251250 A1      Aug. 11, 2022

Related U.S. Application Data

(60) Provisional application No. 63/147,023, filed on Feb. 8, 2021.

(51) Int. Cl.

| | | |
|---|---|---|
| *C08F 2/50* | (2006.01) | |
| *B29C 64/129* | (2017.01) | |
| *B33Y 10/00* | (2015.01) | |
| *B33Y 70/00* | (2020.01) | |
| *C08F 222/10* | (2006.01) | |
| *C08K 5/132* | (2006.01) | |
| *C08K 5/45* | (2006.01) | |
| *C08K 5/5397* | (2006.01) | |
| *B29L 31/00* | (2006.01) | |
| *B33Y 80/00* | (2015.01) | |

(52) U.S. Cl.
CPC ............ *C08F 2/50* (2013.01); *B29C 64/129* (2017.08); *B33Y 10/00* (2014.12); *B33Y 70/00* (2014.12); *C08F 222/102* (2020.02); *C08K 5/132* (2013.01); *C08K 5/45* (2013.01); *C08K 5/5397* (2013.01); *B29L 2031/7536* (2013.01); *B33Y 80/00* (2014.12)

(58) Field of Classification Search
None
See application file for complete search history.

(56) References Cited

U.S. PATENT DOCUMENTS

| | | | |
|---|---|---|---|
| 4,734,333 A | 3/1988 | Leo et al. | |
| 5,981,616 A | 11/1999 | Yamamura et al. | |
| 6,025,114 A * | 2/2000 | Popat | G03F 7/027 430/269 |
| 6,200,732 B1 | 3/2001 | Tamura et al. | |
| 6,451,958 B1 | 9/2002 | Fan et al. | |
| 6,709,271 B2 * | 3/2004 | Yin | A61K 6/893 523/116 |
| 7,357,637 B2 | 4/2008 | Liechtung | |
| 8,513,326 B2 * | 8/2013 | Trujillo-Lemon | C07D 251/34 106/35 |
| 9,902,860 B1 | 2/2018 | Li et al. | |
| 10,788,753 B2 | 9/2020 | Cole | |
| 10,849,724 B2 | 12/2020 | Sun et al. | |
| 11,225,535 B2 | 1/2022 | Klun et al. | |
| 2010/0144919 A1 * | 6/2010 | Borbely | C08F 222/102 526/229 |
| 2014/0239527 A1 * | 8/2014 | Lee | B29C 64/106 264/17 |
| 2017/0158803 A1 | 6/2017 | Amin et al. | |
| 2017/0196657 A1 | 7/2017 | Nixon et al. | |
| 2019/0282335 A1 | 9/2019 | Chen et al. | |
| 2020/0247932 A1 | 8/2020 | Share et al. | |
| 2021/0317297 A1 * | 10/2021 | Jena | A61C 13/34 |
| 2022/0251250 A1 | 8/2022 | Ling et al. | |
| 2022/0325049 A1 | 10/2022 | Lublin | |

FOREIGN PATENT DOCUMENTS

| | | |
|---|---|---|
| CN | 108504277 A | 9/2018 |
| WO | 2015198493 A1 | 12/2015 |
| WO | 2020080643 A1 | 4/2020 |

OTHER PUBLICATIONS

Zhang et al. Influence of the three-dimensional printing technique and printing layer thickness on model accuracy. J Orofac Orthop 80, 194-204 (2019) (Year: 2019).*
Marghalani, H.Y. (2015). Resin-Based Dental Composite Materials. In: Antoniac, I. (eds) Handbook of Bioceramics and Biocomposites. Springer, Cham (Year: 2015).*
Kaisarly et al. Polymerization shrinkage assessment of dental resin composites: a literature review. Odontology 104, 257-270 (2016) (Year: 2016).*
Lee et al. Accuracy of three-dimensional printing for manufacturing replica teeth. Korean J Orthodontics 2015;45(5):217-225 (Year: 2015).*

* cited by examiner

*Primary Examiner* — Sanza L. McClendon
(74) *Attorney, Agent, or Firm* — Klarquist Sparkman, LLP

(57) ABSTRACT

A photo-curable resin composition is suitable for the fabrication of 3D printed objects via digital light processing (DLP) or stereolithography (SLA). The photo-curable resin composition can provide 3D printed objects having lower volumetric shrinkage, high accuracy and favorable mechanical strength for dental application such as building models, implant templates, surgical guides, night guard/occlusal splints, dentures, clear aligners, and temporary restorations.

8 Claims, No Drawings

PHOTOCURABLE RESIN COMPOSITION WITH LOW SHRINKAGE AND HIGH ACCURACY FOR USE IN ADDITIVE MANUFACTURING PROCESSES

RELATED APPLICATIONS

This application claims the benefit of, and priority to, U.S. Provisional Patent Application No. 63/147,023, filed on Feb. 8, 2021. The entirety of the foregoing application is incorporated herein by reference.

BACKGROUND

Digital manufacturing can be divided into subtractive manufacturing process using computer-aided milling or cutting and additive manufacturing processes or 3D printing. As used herein, the term "3D printing" refers to a variety of processes in which material is deposited, joined or solidified under computer control to create a three-dimensional object, with material being added together (such as liquids or powder grains being fused together), typically layer by layer. Additive manufacturing or 3D printing has quickly gained importance and popularity in recent years. Compared to subtractive manufacturing, additive manufacturing provides some advantages in some areas of dentistry. For example, 3D printing can build the objects with complex geometries and more productive with multiple objects per processing operation.

Among 3D printing technologies, stereolithography (SLA) and digital light processing (DLP) are two of the most popular and promising 3D printing technologies capable of reaching the highest standards in terms of higher resolution and better mechanical properties for dental applications. Both are based on light-polymerization technologies used to cure a photosensitive resin layer by layer. The light is typically in the UV region of the electromagnetic spectrum (380-405 nm). The resins are usually composed of epoxy or acrylic/methacrylic monomers and additives such as photo-initiators and UV absorbers. When the resins are cured, volumetric shrinkage is one of the well-known problems which may cause uneven surfaces and reduce accuracy, and even warpage and curling of the printed article. Therefore, the monomer resin material used in SLA/DLP process is critical to successfully fabricate the printed article for dental applications. Lower shrinkage resin materials with excellent accuracy are highly desirable.

Various resin compositions for 3D printing material have been attempted in order to provide low shrinkage and high accuracy of resin materials. For example, U.S. Pat. No. 9,902,860 describes photopolymer compositions for 3D printing having low viscosity, proper curing rate, low volumetric shrinkage, and low ash content.

Furthermore, U.S. Pat. No. 5,981,616, describes resin compositions providing cured products having excellent mechanical strength and minimized shrinkage during curing to ensure high dimensional accuracy. The described resin compositions includes (A) an oxetane compound, (B) an epoxy compound, and (C) a cationic photo-initiator.

U.S. Pat. No. 6,200,732 describes a photocurable resin compositions that can provide moldings and stereolithographed objects having excellent dimensional accuracy with a small volumetric shrinkage factor at the time of photo-curing. The resin compositions are comprised of (A) an urethane acrylate having three or four acrylate groups in the molecule, (B) a radical polymerizable compound different from the above urethane acrylate; and (C) a photopolymerization initiator, the weight ratio of the urethane acrylate (A) to the radical polymerizable compound (B) being 80:20 to 10:90.

In addition, U.S. Pat. No. 10,849,724 describes printable polymerizable material systems for making dental products such as artificial teeth, dentures, splints, veneers, inlays, onlays, copings, frame patterns, crowns and bridges and the like. The resulting three-dimensional object has good dimensional stability.

The new compositions described herein provide resin composition systems with lower volumetric shrinkage and higher accuracy for fabricating 3D printed objects for dental applications such as building models, implant templates, surgical guides, night guards /occlusal splints, dentures, clear aligners, temporary restorations, and other dental articles suitable for fabrication using the 3D printing methods described herein.

SUMMARY 3D printing resin compositions that have low volumetric shrinkage and high accuracy are provided herein. Methods for fabricating the 3D printing resin materials are also provided. 3D printed objects made from the resin compositions via stereolithography (SLA) and digital light processing (DLP) described herein are suitable for dental uses such as building models, implant templates, surgical guide, night guards/occlusal splints, dentures, clear aligners, temporary restorations, and other dental articles suitable for fabrication using the 3D printing methods described herein.

3D printed objects described herein, which have low volumetric shrinkage and high accuracy, are made from compositions of resin monomers and additives that are photo-polymerized layer by layer via stereolithography (SLA) and digital light processing (DLP). In one embodiment, a resin composition comprises: A) at least one photo-polymerizable structural monomer with ethylenically unsaturated groups, B) at least one photo-polymerizable diluent monomer, C) at least one photo-initiator for photo-polymerization, D) at least one light stabilizer/blocker, and E) optionally, additives such as an inhibitor.

The resulting 3D printed objects have low volumetric shrinkage, high accuracy, and favorable mechanical strength.

DETAILED DESCRIPTION

Resin compositions and methods are provided for making 3D printed objects having low volumetric shrinkage and high accuracy. 3D printed objects can be made via vat polymerization processes, such as digital light processing (DLP) and stereolithography (SLA).

According to one embodiment, a resin composition for forming 3D printed objects comprises: A) at least one photo-polymerizable structural monomer with ethylenically unsaturated groups, B) at least one photo-polymerizable diluent monomer, C) at least one photo-initiator for photo-polymerization, D) at least one light stabilizer/blocker, and E) optionally, additives such as an inhibitor.

Structural monomers suitable for use in the resin compositions described herein provide the resin composition with a low volumetric shrinkage and good mechanical strength. Suitable resins may comprise, but are not limited to, a mono-, di-, or poly-functional (meth)acrylate such as bis-phenol A glycidyl methacrylate (BisGMA), 2,2-Bis[4-(2-acryloxyethoxy)phenyl]propane (Bis-MEPP), 2,2-bis[4-(2-methacryloxyethoxy)phenyl]propane, ethoxylated bis phenol A dimethacrylate (EBPADMA) (having 2 to 30 units of ethoxylation), urethane dimethacrylate (UDMA), urethane monomer (FIT 852 from Esstech, Inc.), aliphatic urethane dimethacrylate (e.g., BR-952 from Bomar), poly (ethyleneglycol)(400) extended urethane dimethacrylate (e.g., Exothane 9 from Esstech, Inc.), isophorone urethane dimethacrylate (UDMA-IPDI), or combinations of one or more of the foregoing polymerizable monomers.

In some embodiments, the resin compositions described herein comprise ethoxylated bis phenol A dimethacrylate (EBPADMA) having 2 to 6 units of ethoxylation, or EBPADMA having 2 to 4 units of ethoxylation.

In some embodiments, the structural monomer(s) have/has the highest weight percent of the components in the resin composition. Structural monomers may comprise 70 wt % or more, such as from 70 wt % to 95 wt %, 75 wt % to 95 wt %, or 80 wt % to 90 wt %, of the total weight of the polymerizable resin composition that includes resins, initiators, and additives.

In some embodiments, a lower viscosity resin composition is preferred to obtain good handling properties and high accuracy for 3D printed objects. In these embodiments, a lower viscosity (meth)acrylate monomer is included as a diluent in the resin composition. Suitable lower viscosity diluent monomers include, but are not limited to, triethyleneglycol dimethacrylate (TEGDMA), 1,6-hexanediol dimethacrylate (HDDMA), 1,10-decanediol dimethacrylate (D3MA), neopentyl glycol dimethacrylate (NPDMA), polyethylene glycol dimethacrylates, such as poly(ethyleneglycol)(400) dimethacrylate (PEG400DMA) and poly(ethylene glycol)(600) dimethacrylate (PEG600DMA), isobornyl (meth)acrylate (IBOA and IBOMA), tricyclodecane dimethanol diacrylate, hexyl methacrylate, lauryl methacrylate and tetrahydrofurfuryl methacrylate (THFMA).

Diluent monomers may comprise 5 wt % or more, such as from 5 wt % to 30 wt %, 10 wt % to 20 wt %, or 10 wt % to 15 wt %, of the total weight of the polymerizable resin composition that includes resins, initiators, and additives.

The photo-polymerizable resin composition contains a photo-initiator together with the above resin monomers to generate the free radicals to initiate the photo-polymerization. Photo initiators suitable for use in the resin compositions described herein include bis(2,4,6-trimethybenzoyl)-phenylphosphine oxide, 2,4,6-trimethylbenzoyl diphenylphosphine oxide, ethyl (2,4,6-trimethylbenzoyl) phenylphosphinate; benzoyldiphenylphosphine oxide, benzil dimethyl ketal, 1-hydroxycyclohexyl phenyl ketone, 2-hydroxy-2-methylpropiophenone, 2-hydroxy-2-methyl propiophenone; or a combination of one or more of the foregoing photo initators. In some embodiments, the amount of photo initiator may vary depending on the resin monomers. The concentration of the photo initiator is 0.05 wt % to 3 wt %, preferably 0.1 wt % to 2 wt %, or more preferably from 0.2 wt % to 0.8 wt %, based on the total weight of the polymerizable resin composition.

In some embodiment, a UV stabilizer/blocker is provided to the resin composition to control the curing process for the quality of printed objects and to prevent photo degradation. Suitable UV stabilizer/blockers include 2-hydroxy-4-methoxybenzophenone; 2, 4-dihydroxy benzophenone; 2,5-bis(5-tert-butyl-2-benzoxazolyl)thiophene; or a combination of one or more of the foregoing. In some embodiments, the UV stabilizer/blocker contained in the resin composition comprises 0.005 wt % to 2 wt %, preferably 0.01 wt % to 1 wt %, or more preferably from 0.02 wt % to 0.6 wt %, based on the total weight of the polymerizable resin composition.

In some embodiments, other additive(s) may be provided that are useful in the 3D printing resin composition for some applications. Additives may include one or more of an inhibitor, fluorescent agents, colorants or pigments, and the like. In an embodiment, the resin composition may comprise an inhibitor such as 2,6-di-(tert-butyl)-4-methylphenol (BHT) or 4-methoxyphenol (MEHQ). In an embodiment, the resin composition may comprise fluorescent agents such as 7-hydroxycoumarin or 7-(2H-naphtho[1,2-d]triazol-2-yl)-3-phenylcoumarin. In an embodiment, the resin composition may comprise Lumilux Z-pigments.

Some advantages of the resin compositions described herein are further illustrated by the following Examples and Comparative Examples.

Test Methods

Volumetric Shrinkage

Volumetric Shrinkage (%) was measured by AcuVol (Bisco, Inc. Schaumburg, IL) according to the AcuVol testing procedure. Small, semi-spherical specimens (about 10-15 mg) of resin materials were manually formed. Place the cure gun about 2 mm from the specimen and do not move the gun during curing and light cured for 20 seconds with light intensity of about 1000 mW/cm$^2$ (Bluephase Style, Ivoclar Vivadent AG, Liechtenstein). The results of each resin material were obtained at 5 minutes after light-cured to make sure that there was no further shrinkage change from the observation of 2-3 minutes.

Accuracy

The full-arch models of resin materials were printed by DLP printing system (Asiga 3D printer, MAX UV 405 nm) with the 100 μm of layer thickness based on the designed digital model, washed and post-cured. The 3D-printed models were then scanned using a 3 Shape lab scanner (E3) (, Copenhagen, Denmark) to be compared with the original CAD digital model using GOM-Inspect software (GOM GmbH, Braunschweig, Germany). Accuracy was represented by 3D deviation between scanned 3D printed model and original CAD model.

Flexural strength (FS) and Flexural Modulus (FM)

Flexural strength and flexural modulus were determined by three-point bending method according to ISO-4049. The rectangular test specimens (thickness×width×length=2×2×25 mm, n=5) were printed from the resin materials. After 3D printing, the specimens were washed, post-cured, polished and tested under crosshead speed of 0.75 mm/min on an Instron 5564 universal testing machine. Flexural modulus was determined from the slope of the linear region of the stress-strain curve.

Tensile strength (TS)

The dumbbell-shaped specimens (Type V, n=5) were prepared by 3D printing and tested under crosshead speed of 1.0 mm/min on a Shimadzu (AGS-X-10 KN-table top model) universal testing machine according to the ASTM-D638. The specimens were washed and post-cured before testing.

Examples

Abbreviations:
BR952—aliphatic urethane dimethacrylate
BisGMA—bisphenol A glycidyl methacrylate
EBPADMA—ethoxylated bisphenol A dimethacrylate
TEGDMA—triethyleneglycol dimethacrylate
BAPO—phenylbis(2,4,6-trimethylbenzoyl)phosphine oxide]

BO+−2,5-bis(5-tert-butyl-2-benzoxazolyl)thiophene
BHT -2,6-di-(tert-butyl)-4-methylphenol
UV-9-2-hydroxy-4-methoxybenzophenone Preparation of Resin Composition and 3D Printed Objects 3D printable resin compositions for Examples 1 through 4 were prepared with components in accordance with Table 1. Homogeneous resin mixtures were made by stirring resin monomers with the photo-initiator and other additives.

The resulting resin compositions were printed by DLP printing system (Asiga 3D printer, MAX UV 405 nm), washed and post-cured to form 3D printed objects.

TABLE 1

Resin Compositions

| Component | Amount (wt. %) | | | |
|---|---|---|---|---|
| | Example 1 | Example 2 | Example 3 | Example 4 |
| BR952 | 19.87 | 9.94 | 49.69 | 9.94 |
| BisGMA | 9.94 | 19.87 | 0 | 0 |
| EBPADMA | 59.62 | 59.62 | 39.75 | 79.50 |
| TEGDMA | 9.94 | 9.94 | 9.94 | 9.94 |
| BAPO | 0.40 | 0.40 | 0.40 | 0.40 |
| BO+ | 0.02 | 0.02 | 0.02 | 0.02 |
| BHT | 0.01 | 0.01 | 0.01 | 0.01 |
| UV-9 | 0.20 | 0.20 | 0.20 | 0.20 |
| Total | 100.00 | 100.00 | 100.00 | 100.00 |

3D printed objects corresponding to the compositions of Examples 1-4 were evaluated for volumetric shrinkage, accuracy, flexural strength, flexural modulus and tensile strength, according to the methods described herein. The results of the evaluations are reported in Table 2. Comparative Examples 1 through 3 are commercially available 3D print resins as follows: Die and Model Tan (SprintRay, Inc., Los Angeles, CA), Formlabs Grey Resin (Formlabs Inc., Somerville, MA), and LCD Grey (Roxel3D, Irvine, CA).

barium silicate glass) that are typically included in flowable resin composites. Since 3D printable resins for most applications are typically neat resins without the incorporation of the foregoing fillers, the volumetric shrinkage is typically much higher than the flowable resin composites (with about 50-70 wt. % of filler loading) that are about 3-6% by AcuVol as reported, The resin compositions described herein provide neat resins having volumetric shrinkage of less than 9.0%, such as less than 8.5%, such as less than 8.0%, such as less than 7.5%, such as between 6.5% and 9.0%, such as between 7.0% and 8.5%, such as between 7.0% and 8.0%.

Accuracy contributes to the quality of 3D printed objects for various dental applications, especially for modeling used in restorative, orthodontic, and implant dental applications. The accuracy of 3D printed objects is affected by various factors such as resin composition and material properties, printing system, printing parameters, and post-processing. Since all of the objects prepared as examples and comparative examples were printed by the same DLP printing system and processing conditions, the accuracy will be strongly based on the printed resin materials. As a less than 150 μm and preferable less than 100 μm of the reported value on accuracy is generally desirable, all the resins (Examples 1-4 and Comparative Examples 1-3) exhibited a sufficiently low printing deviation (≤53 μm), especially Example 2 has the lowest value of 3D deviations.

The adequate mechanical properties are important not only for good printability with high accuracy but also for the clinical success of dental uses. Examples 1-4 showed higher flexural strength (FS) and flexural Modulus (FM) than Formlabs Grey resin and lower than LCD Gray resin (Roxel3D). Flexural properties (FS & FM) of Example 2 are similar to Die and Model Tan resin (SprintRay). Like flexural properties, LCD Gray resin has the highest tensile strength among these tested resins. The resin compositions described herein (Examples 1-4) all exhibited higher tensile strength than Formlabs Grey.

TABLE 2

Properties of Resin Materials

| | Volumetric Shrinkage (%) | 3D deviation (μm) (Acurracy) | Flexural strength (MPa) | Flexural modulus (MPa) | Tensile strength (MPa) |
|---|---|---|---|---|---|
| Example 1 | 7.52 ± 0.14[d, e] | 47 | 81.6 ± 1.2 | 1784.9 ± 37.9 | 45.0 ± 0.8 |
| Example 2 | 7.28 ± 0.18[e] | 34 | 87.0 ± 4.0 | 2050.2 ± 61.9 | 45.5 ± 0.6 |
| Example 3 | 8.09 ± 0.27[d] | 48 | 72.2 ± 1.3 | 1554.2 ± 51.8 | 48.0 ± 1.2 |
| Example 4 | 7.60 ± 0.21[d, e] | 41 | 71.9 ± 2.3 | 1554.9 ± 23.2 | 49.8 ± 3.3 |
| Comp. Example 1 (Die and Model Tan, SprintRay) | 10.26 ± 0.37[b] | 48 | 88.5 ± 2.8 | 2109.9 ± 105.1 | 56.3 ± 2.1 |
| Comp. Example 2 (Formlabs Grey, Formlabs) | 11.2 ± 0.35[a] | 53 | 63.4 ± 2.4 | 1446.9 ± 70.7 | 38.5 ± 0.4 |
| Comp. Example 3 (LCD Grey, Roxel3D) | 9.19 ± 0.21[c] | 42 | 108.6 ± 2.5 | 2569.5 ± 84.2 | 59.1 ± 1.4 |

The data for volumetric shrinkage reported in Table 2 was analyzed by one-way ANOVA and Tukey tests ($p<0.05$). Values in the same column with the same superscript (e.g., a, b, c, d or e) are not statistically different according to the statistical tests used.

Examples 1-4 showed a significantly lower volumetric shrinkage (7.28-8.09%) than the comparable commercial resin materials tested (9.19-11.2%). The 3D printable resin compositions described herein all comprise neat resins, meaning that they do not include any fillers (e.g., silica or

We claim:

1. A photo-polymerizable resin composition used for the fabrication of 3D printed objects for dental application consisting of:

A) a photo-polymerizable structural monomer with ethylenically unsaturated groups consisting of bisphenol A glycidyl methacrylate (BisGMA), ethoxylated bisphenol A dimethacrylate (EBPADMA), or a combination of BisGMA and EBPADMA;

B) a photo-polymerizable diluent monomer consisting of triethyleneglycol dimethacrylate (TEGDMA);
C) a photo-initiator for photo-polymerization;
D) a light stabilizer/blocker; and
E) optionally, an inhibitor;

wherein the photo-curable resin does not include any fillers, and wherein the resin when cured has a volumetric shrinkage of less than 8.5% and a 3D deviation of less than 75 µm.

2. The resin composition of claim 1, wherein the structural monomer consists of EBPADMA having 2 to 6 units of ethoxylation.

3. The resin composition of claim 1, wherein the structural monomer consists of EBPADMA having 2 to 4 units of ethoxylation with BisGMA.

4. The resin composition of claim 1, wherein the photo-initiator is selected from bis (2,4,6-trimethybenzoyl)-phenylphosphine oxide, 2,4,6-trimethylbenzoyl diphenylphosphine oxide, ethyl (2,4,6-trimethylbenzoyl) phenylphosphinate, benzoyldiphenylphosphine oxide, benzil dimethyl ketal, 1-hydroxycyclohexyl phenyl ketone, 2-hydroxy-2-methylpropiophenone, 2-hydroxy-2-methyl propiophenone, or a combination of two or more thereof.

5. The resin composition of claim 1, wherein the light stabilizer/blocker is selected from 2-hydroxy-4-methoxybenzophenone, 2, 4-dihydroxy benzophenone, 2,5-Bis (5-tert-butyl-2-benzoxazolyl) thiophene, or a combination of two or more thereof.

6. The resin composition of claim 1, consisting of:
  i. about 70-95 wt. % of the structural monomer;
  ii. about 5-30 wt. % of the diluent monomer;
  iii. about 0.05-3 wt. % of the photo-initiator; and
  iv. about 0.005-2 wt. % of UV stabilizer/blocker.

7. The resin composition of claim 1, wherein the photo-curable resin when cured has flexural strength greater than 70 MPa.

8. The resin composition of claim 1, wherein the photo-curable resin when cured has tensile strength of 43 MPa or higher.

* * * * *